UNITED STATES PATENT OFFICE.

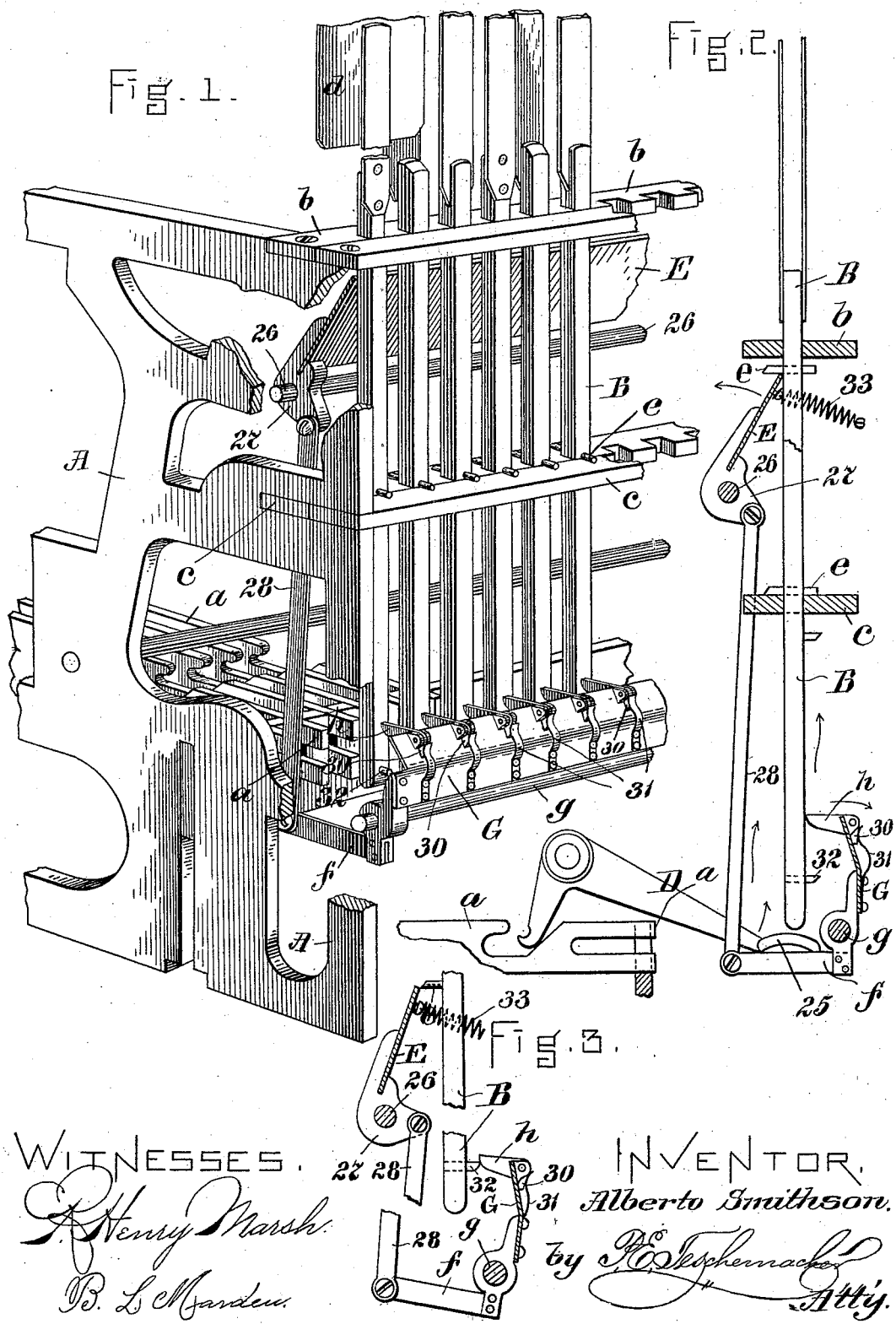

ALBERTO SMITHSON, OF LOWELL, MASSACHUSETTS.

CASH REGISTER AND INDICATOR.

SPECIFICATION forming part of Letters Patent No. 555,407, dated February 25, 1896.

Application filed November 23, 1895. Serial No. 569,936. (No model.)

*To all whom it may concern:*

Be it known that I, ALBERTO SMITHSON, a citizen of the United States, residing at Lowell, in the county of Middlesex and State of Massachusetts, have invented certain Improvements in Cash Registers and Indicators, of which the following is a full, clear, and exact description, reference being had to the accompanying drawings, making part of this specification, in which—

Figure 1 is a perspective view of such parts of a cash register and indicator as are necessary to illustrate my invention. Fig. 2 is a sectional side elevation of the same. Fig. 3 is a detail of the tablet-rod-operating mechanism similar to that shown in Fig. 2, the parts being shown in a different position.

My invention has for its object to simplify and improve the construction of cash registering and indicating machines, and relates particularly to improvements in the mechanism for operating the tablet-rods which carry the indicating-tablets; and my invention consists in certain novel combinations of parts and details of construction, as hereinafter described, and pointed out in the claims.

In the said drawings, A represents a portion of the interior framework of a cash registering and indicating machine.

*b c* are horizontal guide-bars located one above the other and provided with apertures through which slide a series of vertical tablet-rods B, carrying at their upper ends indicating-tablets *d*, (shown in Fig. 1,) adapted to be exposed to view by the elevation of the rods B, each of which is provided with a transverse pin *e*, which rests on the lower guide-bar, *c*, which forms a stop, whereby the downward movement of the rod B is limited as desired. Each tablet-rod is raised by a separate lever D, which is connected with a corresponding key (not shown) through the medium of a slide or other suitable device, the inner end of each lever D having a foot-piece 25, which is brought into contact with the lower end of the tablet-rod to elevate the same.

E is a narrow plate or wing extending in front of the entire series of tablet-rods, said plate being secured to a rock-shaft 26, having its bearings in the framework and provided at one end with a crank-arm 27, to which is pivoted a rod 28, pivoted at its lower end to a bell-crank lever *f* at the end of a horizontal rock-shaft *g*, supported in suitable bearings in the framework and carrying a narrow plate or wing G, provided along its upper edge with a series of pivoted latches *h*, one for each tablet-rod, said latches being each provided with a tailpiece 30, resting on the wing and being held by a light spring 31 in the position shown in Figs. 1 and 2, whereby a downward movement only of the latch is permitted independently of the wing.

At the lower end of each of the rods B is a pin 32, which, when the rod is raised by its lever D, is brought into contact with the latch *h*, thereby forcing the wing G outward and rocking the bell-crank lever *f*, which through the connections described rocks the shaft 26 and swings the wing-plate E into the position shown in Fig. 3, which permits the upper pin, *e*, of the rod B to pass above it, as shown, immediately after which the lower pin, 32, rises above the latch *h*, when the wing E will be instantly returned by a spring 33, Fig. 2, to its original position, together with the lever mechanism and lower wing, G, connected therewith, the pin *e* then resting on the upper edge of the wing E, as shown in Fig. 2, and thus holding the tablet-rod in its raised position, as is necessary to exhibit the indicating-tablet at its upper end.

When the next sale is made and another key is operated to raise another tablet-rod, its pin 32 will, during the first part of the upward movement of the rod, be brought into contact with the latch *h* opposite thereto and again rock the lower wing, G, as previously described, thus causing the upper wing, E, to be withdrawn from under the pin *e* of the tablet-rod previously raised, which when thus released will instantly drop and carry its tablet down out of sight at the same time that the other one is brought into view, the latch *h* yielding against the resistance of its spring to permit the pin 32 to pass beneath it into the position shown in Fig. 1.

It will be seen that the mechanism for retaining and releasing the tablet-rods is independent of and entirely disconnected from the keys which operate said rods, the construction being such that each tablet-rod as it is raised will trip the retaining device and thereby release the previously-raised tablet-rod and permit it to drop to its normal position, as desired, the mechanism being exceedingly simple, durable and not liable to get out of order.

The registering-wheels and mechanism connected therewith for showing the sales, total additions, &c., are not here represented, as they form no part of my present invention.

What I claim as my invention, and desire to secure by Letters Patent, is—

1. In a cash register and indicator, the combination with a series of tablet-rods each carrying an indicating-tablet, of a retaining device consisting of a spring-operated wing or plate extending along the entire series of tablet-rods and adapted to engage a pin or projection on each rod to support the same in a raised position, said wing being mounted on a rock-shaft, independent lever mechanism connected with said rock-shaft and having no connection with the operating-keys, and a second wing or plate extending along the entire series of tablet-rods and connected with said lever mechanism, said wing having a series of pivoted latches, one for each rod, pins or projections on the tablet-rods adapted to contact with said latches as the rods are raised and thereby operate the lever mechanism to release the previously-raised tablet-rod, and said latches yielding downwardly to permit the lower pins of the tablet-rods to pass the same in their downward movement, substantially as set forth.

2. In a cash register and indicator, the combination with a series of vertically-sliding tablet-rods, each carrying an indicating-tablet, of a retaining device consisting of a wing or plate E, mounted on a rock-shaft and extending along the entire series of rods and adapted to respectively engage a pin or projection on each of said rods to support the same in a raised position, independent lever mechanism for operating the retaining device, said mechanism having no connection with the operating-keys, a second movable wing or plate G, extending along the entire series of tablet-rods and provided with a series of latches, one for each rod, and adapted to be engaged by a pin or projection on the rod opposite thereto as the latch is raised, whereby the wing G, is actuated to operate the retaining device and release the previously-raised tablet-rod, substantially as described.

Witness my hand this 18th day of November, A. D. 1895.

ALBERTO SMITHSON.

In presence of—
P. E. TESCHEMACHER,
B. L. MARDEN.